United States Patent [19]
Nakatani et al.

[11] Patent Number: 5,784,521
[45] Date of Patent: Jul. 21, 1998

[54] SIGNAL RECORDING SYSTEM

[75] Inventors: Yoshihiro Nakatani; Koji Takahashi; Teruo Hieda; Kenji Kyuma; Koichiro Suzuki; Takeshi Abe; Yoshifumi Ishikawa, all of Kanagawa-ken, Japan

[73] Assignee: Canon Kabushiki Kaisha, Tokyo, Japan

[21] Appl. No.: 322,733

[22] Filed: Oct. 13, 1994

Related U.S. Application Data

[63] Continuation of Ser. No. 126,809, Sep. 24, 1993, abandoned, which is a continuation of Ser. No. 664,039, Mar. 4, 1991, abandoned.

[30] Foreign Application Priority Data

Mar. 9, 1990 [JP] Japan ............................ 2-59031
Nov. 8, 1990 [JP] Japan ............................ 2-304952

[51] Int. Cl.⁶ ........................................... H04N 5/91
[52] U.S. Cl. ..................... 386/46; 386/95; 386/117; 348/232
[58] Field of Search ................. 360/14.1, 33.1, 360/13; 358/335, 906, 909, 22, 909.1; 386/46, 38, 95, 117, 121; 348/232, 233

[56] References Cited

U.S. PATENT DOCUMENTS

| | | | |
|---|---|---|---|
| 4,688,106 | 8/1987 | Keller et al. | 360/14.1 X |
| 4,855,831 | 8/1989 | Miyamoto et al. | 358/22 X |
| 4,899,229 | 2/1990 | Hashimoto | 360/141 |
| 5,003,404 | 3/1991 | Yoshimura et al. | 358/335 |
| 5,124,814 | 6/1992 | Takahashi et al. | 358/341 X |
| 5,130,813 | 7/1992 | Oie et al. | 360/33.1 X |
| 5,140,436 | 8/1992 | Blessinger | 360/5 X |
| 5,175,624 | 12/1992 | Hieda et al. | 358/906 X |
| 5,187,589 | 2/1993 | Kono et al. | 358/335 |

FOREIGN PATENT DOCUMENTS

| | | |
|---|---|---|
| 871596 | 10/1978 | Belgium . |
| A-0016560 | 10/1980 | Germany . |
| 1248878 | 10/1989 | Japan . |
| 1314077 | 12/1989 | Japan . |
| 2037567 | 2/1990 | Japan . |
| 2037568 | 2/1990 | Japan . |
| 2043982 | 10/1980 | United Kingdom . |

OTHER PUBLICATIONS

Patent Abstracts of Japan No. JP1-314077, Takahashi et al. published Dec. 19, 1989, Camera Incorporated with VTR and Video Camera.
Patent Abstracts of Japan No. JP2037567, vol. 14, No. 195 (P 1039), published Feb. 7, 1990, Video Tape Recorder, Mutsumi.
Patent Abstracts of Japan No. JP2037568, vol. 14, No. 195 (P 1039), published Feb. 7, 1990, Recording and Reproducing Device, Satoshi.

*Primary Examiner*—Andrew L. Sniezek
*Attorney, Agent, or Firm*—Robin, Blecker & Daley

[57] ABSTRACT

A recording apparatus for recording an information signal on a recording medium is arranged to be controlled according to control information read out from an external storage device which is attachable and detachable to and from the recording apparatus, so that the apparatus is not only simply operable but also has diverse functions. One of the features of the apparatus lies in that the timing of start or stop of recording can be synchronized with that of a signal combining action or a signal fade-in or fade-out action.

24 Claims, 10 Drawing Sheets

CONTROL DATA 1

- KEY-INPUT WAITING INSTRUCTION
- TITLE-COMBINING BEGINNING INSTRUCTION
- CHARACTER-COMBINING BEGINNING INSTRUCTION
- KEY-INPUT WAITING INSTRUCTION
- CHARACTER-COMBINING ENDING INSTRUCTION
- TITLE-COMBINING ENDING INSTRUCTION
- CONTROL ENDING INSTRUCTION

FIG. 6(B)

CONTROL DATA 2

- KEY-INPUT WAITING INSTRUCTION
- TITLE-COMBINING BEGINNING INSTRUCTION
- KEY-INPUT WAITING INSTRUCTION
- FADE-OUT OPERATING INSTRUCTION
- TITLE-COMBINING ENDING INSTRUCTION
- FADE-OUT CANCELING INSTRUCTION
- CONTROL ENDING INSTRUCTION

FIG.6(D)

CONTROL DATA 4

| TAPE CHECKING INSTRUCTION |
| --- |
| KEY-INPUT WAITING INSTRUCTION |
| TITLE-COMBINING BEGINNING INSTRUCTION |
| TAPE CHECKING INSTRUCTION |
| KEY-INPUT WAITING INSTRUCTION |
| TITLE-COMBINING ENDING INSTRUCTION |
| TAPE CHECKING INSTRUCTION |
| CONTROL ENDING INSTRUCTION |
| CONTROL REPEATING INSTRUCTION |

FIG.6(C)

CONTROL DATA 3

| KEY-INPUT WAITING INSTRUCTION |
| --- |
| VTR STARTING INSTRUCTION |
| TITLE-COMBINING BEGINNING INSTRUCTION |
| KEY-INPUT WAITING INSTRUCTION |
| VTR STOPPING INSTRUCTION |
| TITLE-COMBINING ENDING INSTRUCTION |
| CONTROL ENDING INSTRUCTION |

SIGNAL RECORDING SYSTEM

This is a continuation application under 37 CFR 1.62 of prior application Ser. No. 08/126,809, filed on Sep. 24, 1993 (aban.) which is a cont. of Ser. No. 07/664,039 filed Mar. 4, 1991 (aban.)

Background of the Invention

1. Field of the Invention

This invention relates to a signal recording system and more particularly to a method for determining the timing of control over the operation of a recording apparatus.

2. Description of the Related Art

Heretofore, many systems have been proposed for combining a recording video signal with the images of characters, symbols, specific pictures, etc., for example, by superimposing them on the video signal for the purpose of enhancing the image effect in recording the video signal which is obtained by a video camera or in recording an audio signal obtained along with the video signal.

First, in respect of the method of combining a video signal obtained by shooting with some other image signal, a system which uses a so-called character generator is, for example, employed in many cases. This system comprises a pattern ROM (read-only memory) which stores therein such patterns as characters, symbols, etc., that can be displayed; registers which store therein the kinds of characters to be displayed for all display positions; and a reading part which is arranged to read out the contents of the pattern ROM corresponding to the contents of the above-stated registers in accordance with horizontal and vertical synchronizing signals and to use the read-out contents to be combined with a video signal. In cases where the characters are to be displayed, the display is made by writing the kinds of the displayed characters into the registers provided for applicable display positions.

Another example of systems of this kind is arranged to convert by analog-to-digital (A/D) conversion means the signal obtained by shooting into a digital signal of one to several bits; to store the digital signal in a memory for every one of the display picture elements; to read out the stored digital signal from the memory in accordance with horizontal and vertical synchronizing signals; and to use the read-out signal to be combined with a video signal obtained separately by shooting.

A further example of known systems is arranged to include a graphic memory which corresponds to each of the picture elements of an image plane, a microcomputer which writes into the graphic memory data to be displayed and a reading circuit which reads out the contents of the graphic memory in accordance with horizontal and vertical synchronizing signals; and to use the read-out contents to be combined with a video signal obtained by shooting.

However, the insertion of predetermined images into a signal obtained by shooting as mentioned above necessitates not only the use of various equipment for the above-stated processes, but also that of connection lines for connection with this various equipment. Therefore, it is extremely difficult to have them at the homes of ordinary people who are not in this business.

Further, in cases where the start and stop of recording or reproduction of images are to be controlled simultaneously with the start and stop of generation of music, separate apparatuses such as a music-generating apparatus and an image recording/reproducing apparatus must be manually operated at the same time since there is no simple device for simultaneous control over images and music.

Simultaneous manual operations on two separate apparatuses with apposite timing are not only difficult but also quite troublesome. As a result, the parts of music are not neatly connected. The timing of an end of music must be borne in mind during the process of image recording or reproduction. It has been difficult to attain any satisfactory result from such a manual operation.

Meanwhile, there has been proposed another system which is arranged as follows: An external storage device for storing various video and audio data, etc. is arranged to be removabe and attachable to the above-stated video signal recording apparatus. A video signal obtained by shooting and an audio signal obtained by collecting sounds are recorded by either combining or replacing them with the video and audio data read out from the external storage device. The systems of this kind have been disclosed, for example, in U.S. patent applications Ser. No. 619,768, filed on Nov. 29, 1990 and Ser. No. 633,974, filed on Dec. 26, 1990. The system of this kind is highly advantageous in that it permits recording many diverse signals without increasing its size.

However, the quality of a work obtained by such a system greatly depends on the timing of recording the video and audio data read out from the external storage device. For example, an image of a title or the like read out from the external storage device is inserted, during a given period of time from the start of shooting, into a picture obtained by shooting and, after the lapse of the given period of time, the scene of the picture is changed to another scene by canceling the insertion of the title at the same time. In this instance, the quality of the work would be degraded if timing of cancellation of the title insertion disagrees with the timing of the change-over of the scene.

Meanwhile, it is not easy for ordinary users to operate the recording apparatus at apposite timing while selecting and obtaining an image from among other images stored in the external storage device, because it requires a certain degree of skill. Besides, the difficulty of this operation increases if it involves other functions, such as character generation, fade-in and fade-out, etc.

In other words, the above-stated system should be improved in respect of operability.

SUMMARY OF THE INVENTION

It is an object of this invention to provide a signal recording system which is arranged to permit simple recording operations on diverse signals without the complexity of operation required by the conventional signal recording system.

Under this object, an information signal recording system which is arranged as an embodiment of this invention comprises: a recording apparatus including recording means for recording an information signal on a recording medium; and an external storage device which is attachable to and detachable from the recording apparatus and is arranged to store control information, the recording apparatus further including control means for controlling an operation of the recording apparatus in accordance with the control information read out from the external storage device.

It is another object of the invention to provide a signal recording system which is arranged to permit synchronization of image recording and sound generation with each other by a simple operation.

Under that object, an information signal recording system arranged according to this invention comprises: video input means for receiving a video signal; storage means for storing control information and audio information; audio generating means for generating an audio signal corresponding to the audio information; recording means for recording on a recording medium the video signal and the audio signal; and control means for controlling an operation of the audio generating means and a recording operation of the recording means in accordance with the control information read out from the storage means.

The above and other objects and features of the invention will become apparent from the following detailed description of embodiments thereof taken in conjunction with the accompanying drawings.

DETAILED DESCRIPTION OF THE PREFERRED EMBODIMENTS

Figure 1:
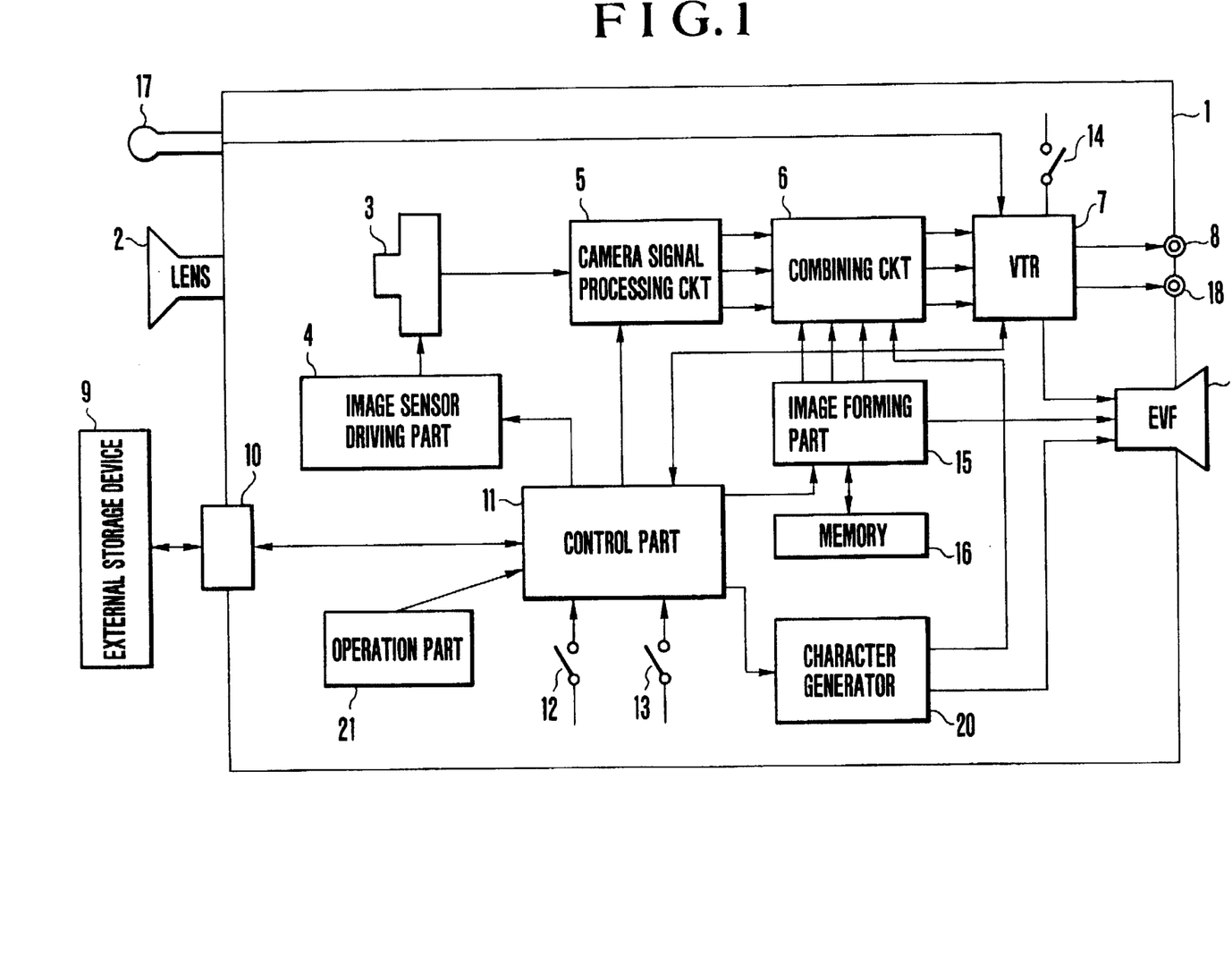
FIG. 1 is a block diagram showing in outline the arrangement of a video camera system which is arranged as an embodiment of this invention.

The following describes the details of this invention through embodiments thereof:

FIG. 1 is a block diagram showing in outline the arrangement of a video camera system which is arranged according to this invention as an embodiment thereof. The illustration includes the body 1 of a VTR-integrated type video camera; a photo-taking lens 2; an image sensor 3; an image sensor driving part 4; a camera signal processing circuit 5; a combining circuit 6 which is arranged to combine a video signal obtained by shooting with other video signals such as a title signal, etc.; a VTR part 7; a video output terminal 8 for outputting the video signal; an external storage device 9 which is connected to the camera body 1; a connection part 10 which is arranged to permit the external storage device 9 to be attached to or detached from the camera body 1 and to make electrical connection between the two; a control part 11 which is arranged to control the external storage device 9, to send and receive data, to control a switch operation and to control a character generator 20, etc.; a preparation switch 12; a control switch 13; a cassette switch 14 which is arranged to detect the mounting of a tape cassette on the VTR part 7; an image forming part 15 which is arranged to form a title signal; a memory 16 which is arranged to hold image data included in the title data read-out from the external storage device 9 and to permit writing and reading actions thereon; a microphone 17 which is mounted on a part of the camera body 1 and is arranged to record sounds; an audio output terminal 18; an electronic viewfinder 19 (EVF) which is arranged to display images obtained during recording and reproducing operations and to display also character information about the state of operation; the character generator 20; and an operation part 21 which includes a ten-key part, plus and minus keys, etc.

An object image (not shown) obtained by the photo-taking lens 2 is formed on the image sensor 3. The image sensor 3 photo-electrically converts this object image into an image signal, which is supplied to the camera signal processing circuit 5. The image sensor 3 is arranged to perform a prescribed image sensing action in accordance with a timing pulse signal output from the image sensor driving part 4. The camera signal processing circuit 5 performs a given processing action on the image signal and produces a video signal as a result of the action. The video signal thus obtained is supplied to the combining circuit 6 to be combined with a title signal, etc. which will be described later. The signal thus formed by the combining circuit 6 is supplied to the VTR part 7 to be recorded there. At the time of reproduction, the output of the VTR part 7 is supplied from the video output terminal 8 to an external apparatus such as a TV monitor or the like.

Meanwhile, the sounds obtained by the microphone 17 are recorded by the VTR part 7 either in a predetermined audio track or in an audio recording band along with the above-stated video signal. At the time of reproduction, the audio signal is supplied from the audio output terminal 18 to an external apparatus such as a TV monitor or the like.

The control part 11 operates according to the states of switches 12, 13 and 14, the connection state of the external storage device 9 which is connected to the connection part 10, communication data, etc. and is arranged to transfer data to the image forming part 15, to control the image forming part 15 and to control the character generator 20 for displaying information in the form of characters or the like on the electronic viewfinder (EVF) 19. The image forming part 15 is arranged to receive data from the control part 11, to write the received data into the memory 16 and to form a title image signal by reading out the data from the memory 16 in accordance with the instruction of the control part 11. The title image signal thus obtained is combined with the video signal, as mentioned above, by the combining circuit 6. Further, the connection part 10 is arranged to permit each of the external storage devices of varied kinds to be detached and attached thereto as the external storage device 9.

Figure 2:
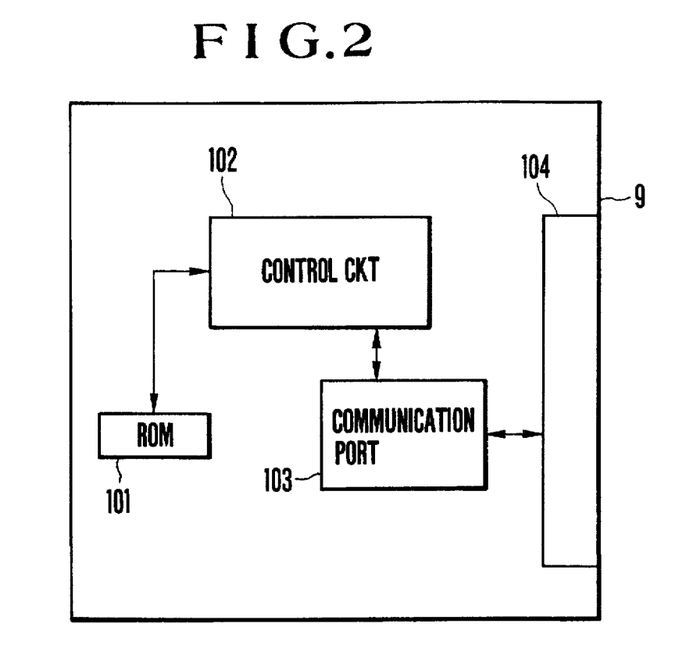
FIG. 2 is a block diagram showing the arrangement of an external storage device included in the same embodiment of the invention.

FIG. 2 shows the arrangement of the external storage device 9 for the purpose of describing a specific embodiment of this invention. The illustration includes a ROM 101; a control circuit 102, a serial communication port 103 and a connector 104 which is provided for electrical connection with the camera body 1. When an instruction is received from the camera body 1 via the connector 104 and the communication port 103, an action is performed in accordance with the instruction. For example, data is read out from the ROM 101, and the readout data is sent to the camera body 1 via the communication port 103 and the connector 104.

Figure 3:
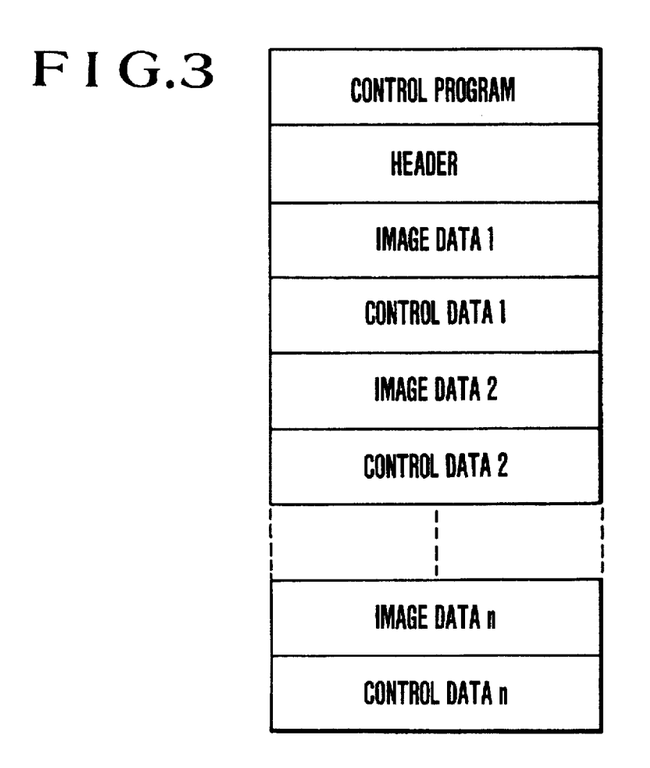
FIG. 3 schematically shows data stored in a ROM shown in FIG. 2.

FIG. 3 schematically shows by way of example the data contained within the ROM 101 of FIG. 2. As shown, the head part of the ROM 101 stores a control program for conducting the above-stated communication, interpreting the instruction, reading out data, etc. Following the control program, there is provided a header part which contains data indicating the kind of the external storage device 9, the leading address of each data contained, etc. The header part is followed by image data 1 to n (n: a natural number) and control data 1 to n which are stored at predetermined addresses in the order as shown in FIG. 3. Further, the number n of combinations of the image data and the control data stored in each piece of the external storage devices is 10 to 20 or thereabout.

Figure 4:
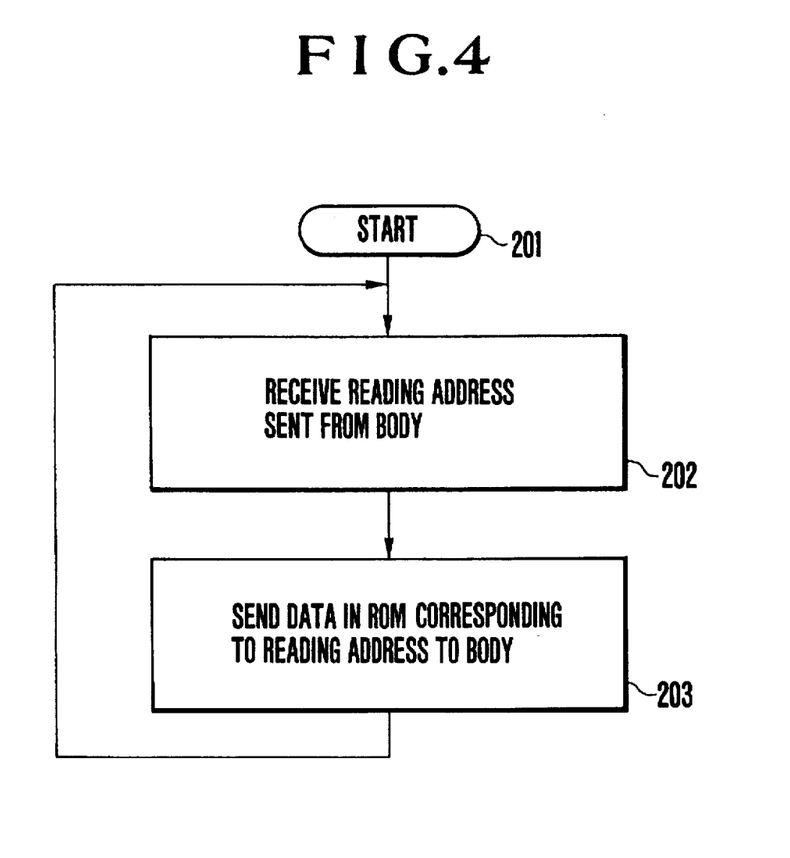
FIG. 4 is a flow chart showing the operation of a control circuit included in the external storage device of FIG. 2.

FIG. 4 is a flow chart showing the operation of the control circuit 102 disposed within the external storage device 9. The operation begins at a step 201. At a step 202: The control circuit 102 first receives a reading address sent from the camera body 1. At a step 203: Data stored at the reading address is sent to the camera body 1, and the flow of operation comes back to the step 202 to repeat the above-stated process.

Figure 5A:
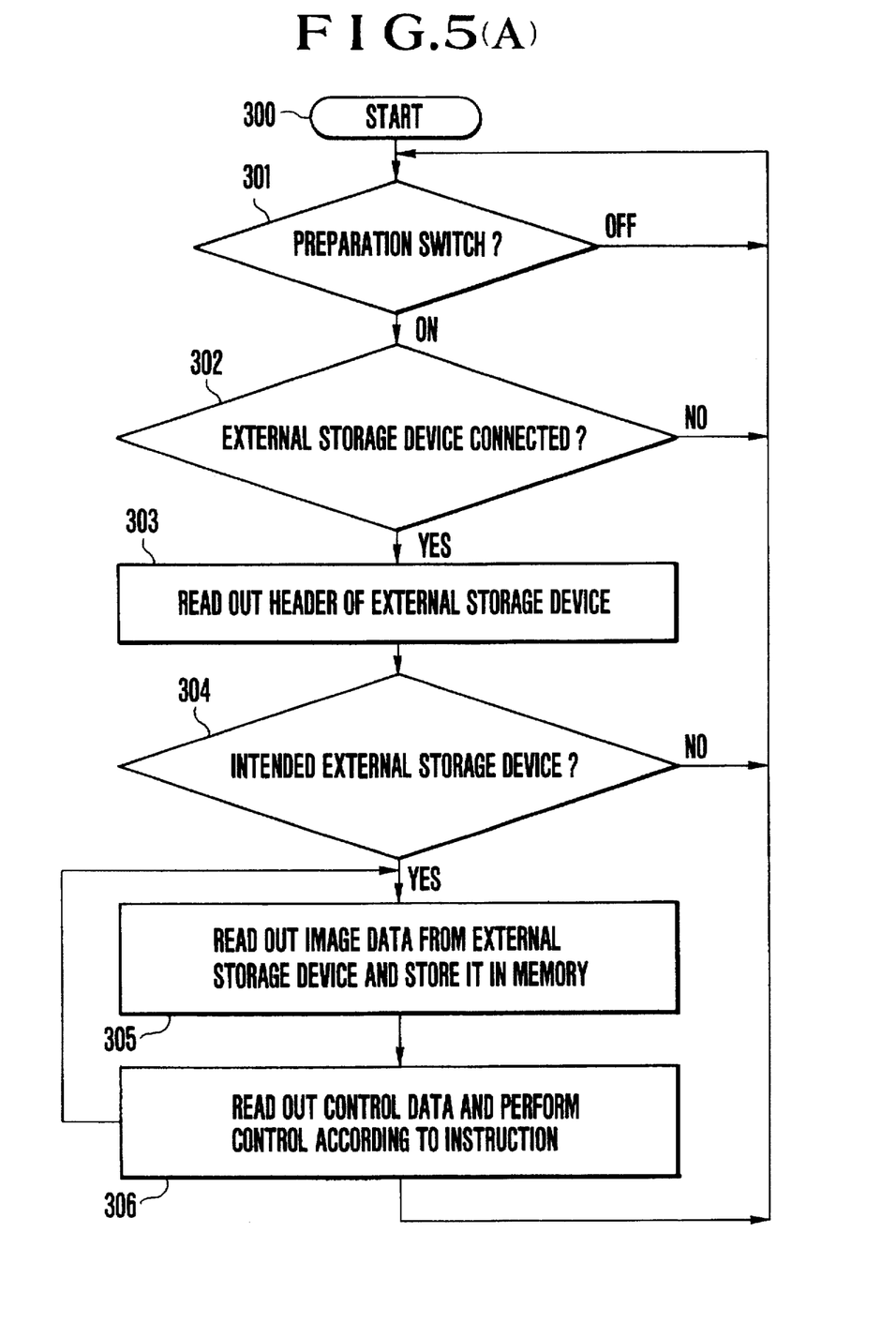
FIG. 5(A) is a flow chart showing in outline the operation of a control part disposed within a camera body.

FIG. 5(A) is a flow chart showing the operation of the control part 11 which is disposed within the camera body 1. Referring to FIG. 5(A), a check is made for the state of the preparation switch 12 at a step 301. The flow comes to a step 302 if the switch 12 is found in an on-state, or the flow comes back to the step 301 to repeat the check for the state of the switch 12 if the switch 12 is in an off-state. At the step 302: A detection terminal or the like which is provided at the connection part 10 is checked for the presence or absence of the external storage device 9. If the device 9 is thus found to be in connection, the flow comes to a step 303. If not, the flow comes back to the step 301 to repeat the same process. At the step 303: The header of the external storage device 9 is read out. At a step 304: A check is made to find if the external storage device 9 is of an intended kind. If so, the flow comes to a step 305. If not, the flow comes back to the step 301 to repeat the preceding steps. At the step 305: One of the "n" number of combinations of image data and control data is selected, and the image data thus selected is read out from the external storage device 9. The image data thus read out is then stored in the memory 16 through the image forming part 15. At a step 306: The control data is read out also from the external storage device 9. Applicable parts are controlled one after another according to a control instruction indicated by the control data. After completion of the control, the flow comes back to the step 301 to repeat the above-stated processes.

Figure 5B:
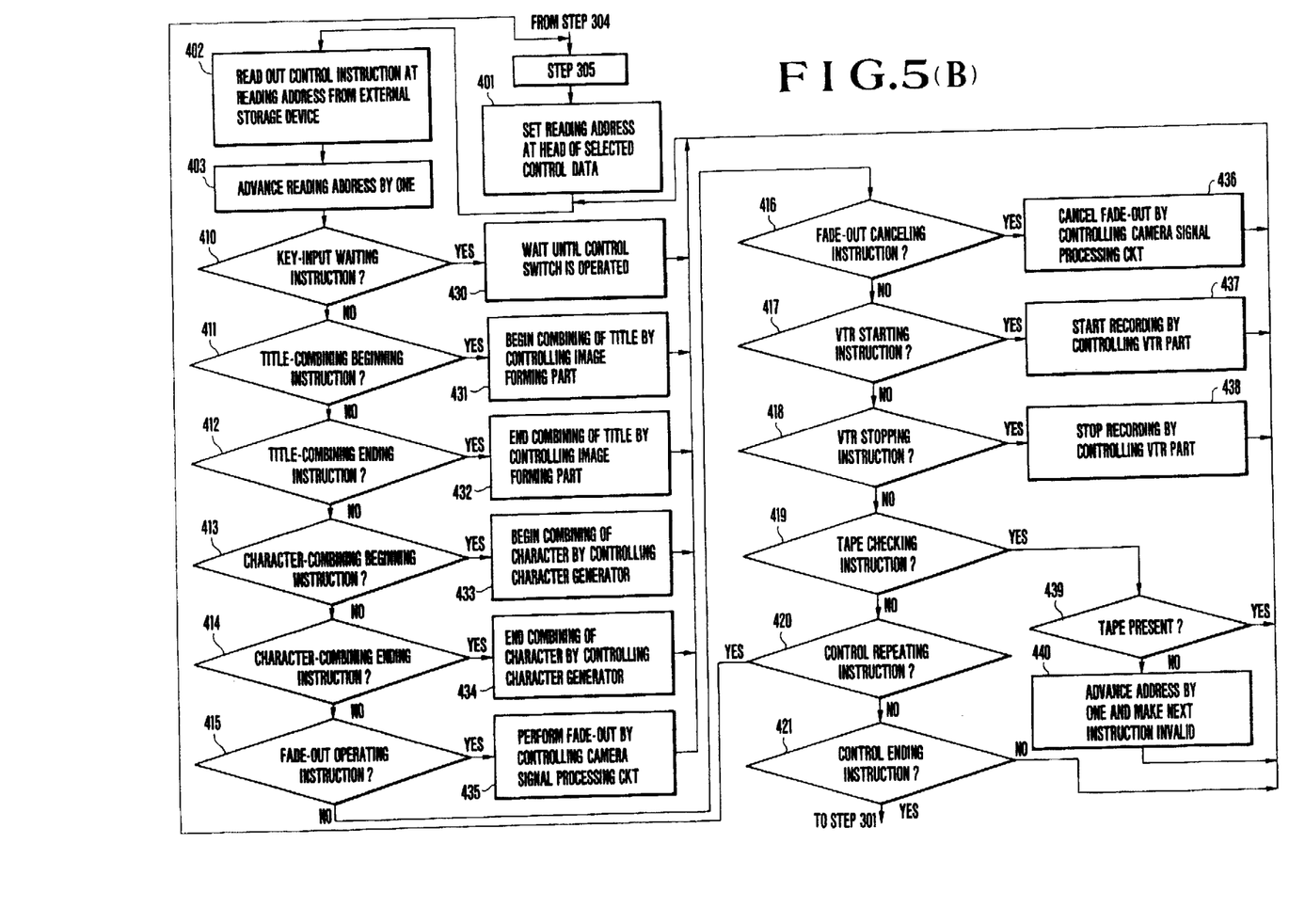
FIG. 5(B) is a flow chart showing in detail a part of FIG. 5(A).

FIG. 5(B) is a flow chart showing the details of the steps 305 and 306 of FIG. 5(A). The control operation begins through the steps 304 and 305 of FIG. 5(A). Then, at a step 401, a reading address is set, within the ROM 101 of the external storage device 9, at the head of the control data selected at the step 305. At a step 402: the control data stored at the reading address is read out from the external storage device 9. At a step 403: The reading address is advanced by one. At steps 410 to 421: Each of the data thus read out is regarded as an instruction, and the flow branches to a respective one of steps 430 to 439, 305 and 301 as applicable. If the instruction is found to be not applicable to any of these steps, the flow comes back to the step 402 to make the instruction invalid.

If the above-stated instruction is an instruction for waiting for a key input, the flow comes to the step 430 to wait until the control switch 13 is operated. After the switch 13 is operated, the flow comes back to the step 402 to continue the control operation.

In the event of an instruction for starting a title combining action, the flow comes to the step 431. At the step 431: The image forming part 15 is controlled and caused to supply the title image data which has been stored in the memory 16 at the step 305 of FIG. 5(A) to the combining circuit 6 in such a way as to combine the title image data with the recording signal. After that, the flow comes back to the step 402 to proceed with the control operation. If the instruction is for ending the title combining process, the flow comes to the step 432. At the step 432: The image forming part 15 is controlled and caused to stop supplying the title image data to the combining circuit 6. After that, the flow comes back to the step 402 to proceed with the control operation.

In a case where the instruction is for starting a character combining process, the flow comes to the step 433. At the step 433: The character generator 20 is controlled and caused to begin to supply a character signal to the combining circuit 6. After that, the flow comes back to the step 402 to continue the control operation. If the instruction is for ending the character combining process, the flow comes to the step 434. At the step 434: The character generator 20 is controlled and caused to stop supplying the character signal to the combining circuit 6. After that, the flow comes back to the step 402 to continue the control operation.

In the event of an instruction for a fade-out action, the flow comes to the step 435. At the step 435: The camera signal processing circuit 5 is controlled in such a way as to fade out the video signal obtained by shooting. After that, the flow comes back to the step 402 to further proceed with the control operation. In a case where the instruction is for canceling the fade-out action, the flow comes to a step 436. At the step 436: The camera signal processing circuit 5 is controlled in such a way as to bring the video signal back to its normal state (fade-in). The flow then comes back to the step 402 to further continue the control operation.

In a case where the instruction is for starting the VTR, the flow comes to a step 437. At the step 437: The VTR part 7 is controlled and caused to start recording. After that, the flow comes back to the step 402 to continue the control operation. In a case where the instruction is for bringing the operation of the VTR to a stop, the flow comes to the step 438. At the step 438: The recording operation is brought to a stop by controlling the VTR part 7. The flow then comes back to the step 402 to continue the control operation. If the instruction is for making a check for the tape, the flow comes to the step 439. At the step 439: The state of the cassette switch 14 is detected through the VTR part 7 to find the presence or absence of a cassette tape. If no cassette tape is mounted, the flow comes to a step 440. At the step 440: The reading address is advanced by one and the next instruction is made invalid. After that, the flow comes back to the step 402 to further proceed with the control operation. In the event of a control repeating instruction, the flow comes back to the step 305 to repeat the selection of image data and control data and the control operation from the beginning. In a case where the instruction is for ending the control, the flow comes back to the step 301 of FIG. 5(A) to terminate the control operation.

Figure 6A:
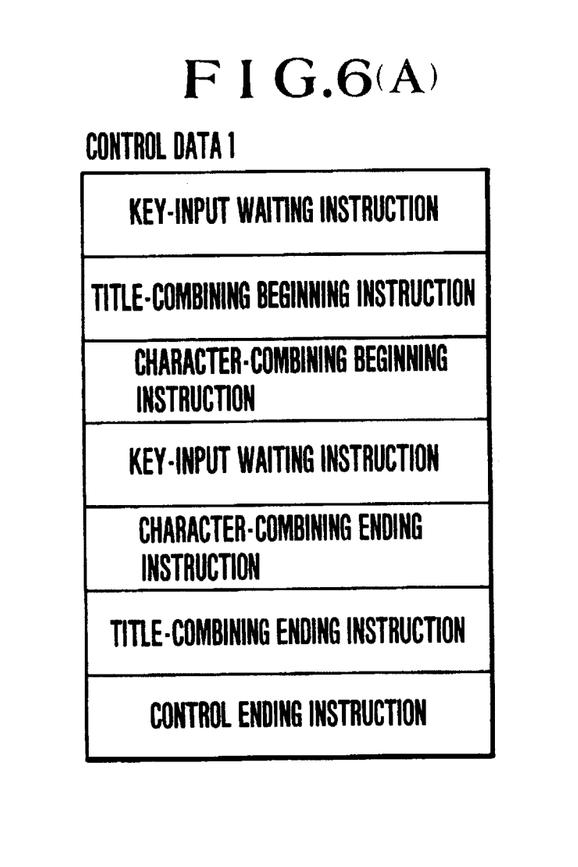
FIGS. 6(A), 6(B), 6(C) and 6(D) schematically show examples of control data of FIG. 3.

FIG. 6(A) schematically shows a first example of control data (hereinafter referred to as control data 1) which is stored within the ROM of the external storage device 9. The following describes programmed processes performed in accordance with the control data 1. The preparation switch 12 is first operated by the operator. After that, with the external storage device 9 connected to the camera body 1 and the control data 1 selected, the control part 11 proceeds to operate as follows:

First, in accordance with an instruction for waiting for a key input, the control part 1 waits until the control switch 13 is operated by the operator. When the control switch 13 is operated, the image forming part 15 is controlled and caused to supply the title image data which has been stored to the combining circuit 6. The title image data is then superimposed, as a title, on the video signal obtained by shooting in a manner as shown in FIG. 6(E). At the same time, in accordance with an instruction for a start of a character combining action, the character generator 20 is controlled and caused to begin to supply a character signal to the combining circuit 6. Then, as shown in FIG. 6(F), an image which overlaps with the title image is combined with the video signal obtained by shooting. Next, in accordance with another key input waiting instruction, the control part 11 waits until the control switch 13 is again operated by the operator. When the control switch 13 is operated again, the image forming part 15 is caused, in accordance with an instruction for ending the title combining action, to stop supplying the title image data to the combining circuit 6. Then the title image ceases to be combined with the video signal obtained by shooting. Further, in accordance with an instruction for ending the character combining action, the character generator 20 is caused to stop supplying the character signal. This brings the title and character combining actions to an end. After that, in accordance with a control ending instruction, the flow of operation comes back to the step 301 to end the control operation.

The above-stated processes enable the operator to synchronously insert the title and characters by simply operating the control switch 13.

Figure 6B:
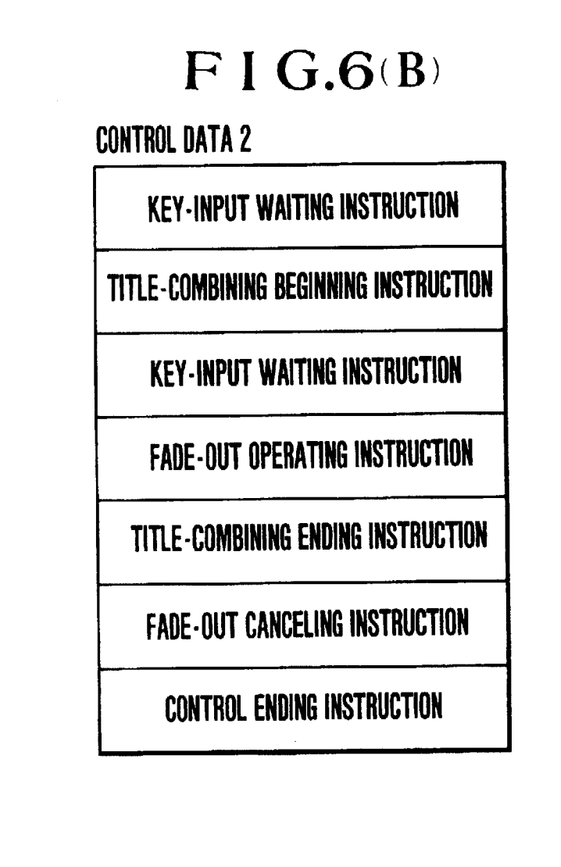

FIG. 6(B) schematically shows a second example of the control data (hereinafter referred to as control data 2) stored within the ROM of the external storage device 9. Programmed processes to be performed according to the control data 2 are as follows:

With the external storage device 9 connected to the camera body 1 and with the control data 2 selected, the control part 11 proceeds, after the preparation switch 12 is operated by the operator, to carry out the processes according to the control data 2. First, in accordance with a key input waiting instruction, the control part 11 waits until the control switch 13 is operated by the operator. When the control switch 13 is operated, a title begins to be combined with the video signal obtained by shooting in response to a title-combining beginning instruction. Then, in accordance with another key input waiting instruction, the control part 11 waits until the control switch 13 is again operated by the operator. When the control switch 13 is again operated, the camera signal processing circuit 5 is controlled and caused, in response to an instruction for a fade-out action, to fade out the video signal obtained by shooting. Upon completion of the fade-out process, the title inserting process also comes to an end in response to a title-combining ending instruction. Then, in response to a fade-out canceling instruction, the camera signal processing circuit 5 is controlled and caused to fade in the video signal. After completion of the fade-in, the control operation comes to an end in response to a control ending instruction.

The above-stated control processes enable the operator to fade out and fade in the video signal in concordance with the title inserting action by simply operating the control switch 13.

Figure 6C:
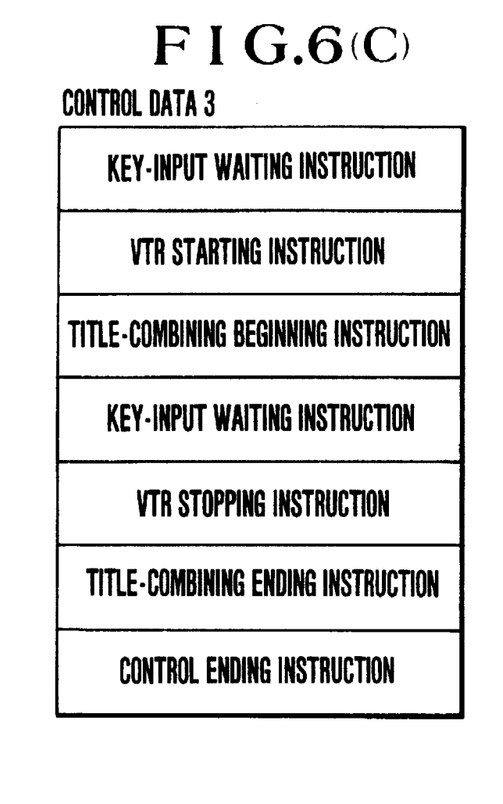

FIG. 6(C) schematically shows a third example of the control data (hereinafter referred to as control data 3) stored within the ROM of the external storage device 9. In the same manner as the processes described in the foregoing, the preparation switch 12 is first operated by the operator. Then, with the external storage device 9 assumed to be connected to the camera body 1 and the control data 3 to be selected, the control part 11 proceeds to carry out processes in accordance with the control data 3 in the following manner:

First, in accordance with a key input waiting instruction, the control part 11 waits until the control switch 13 is operated by the operator. When the control switch 13 is operated, the VTR part 7 is controlled and caused to begin the recording in response to a VTR starting instruction. Then, in response to an instruction for starting a title combining action, a title is inserted in the video signal obtained by shooting (a recording video signal) in the same manner as described in the foregoing. After that, in accordance with another key input waiting instruction, the control part 11 waits until the control switch 13 is again operated by the operator. When the control switch 13 is again operated, the VTR part 7 is again controlled to bring its recording action to an end in response to a VTR stopping instruction. Then, in response to an instruction for ending the title combining process, the title combining process is brought to a stop and the control operation is terminated in response to an instruction for ending the control.

The above-stated processes enable the operator to have the timing of the starting or stopping of recording and the title image combining in perfect concordance.

Figure 6D:
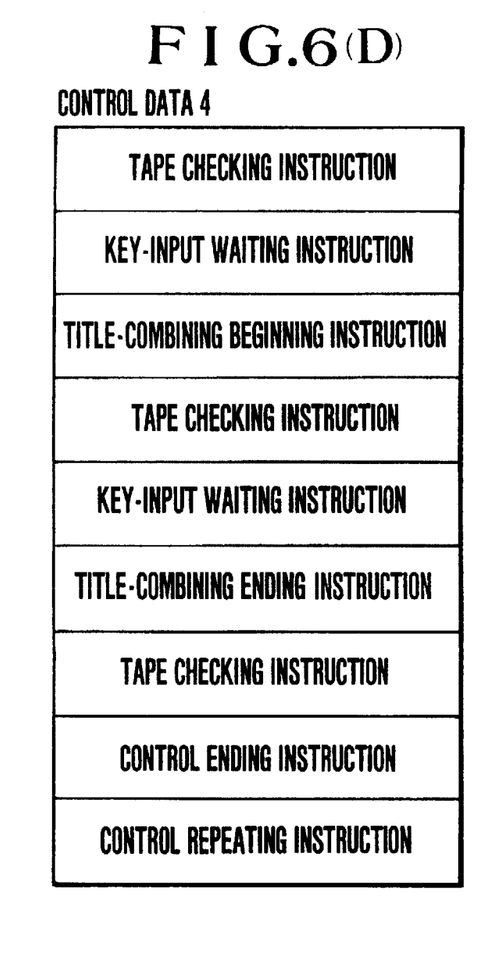
Figure 6E:
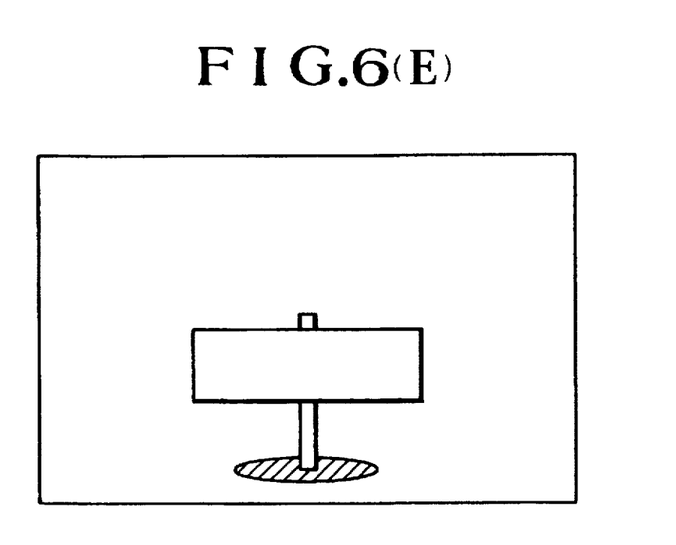
FIGS. 6(E) and 6(F) show operations performed according to the control data.
Figure 6F:
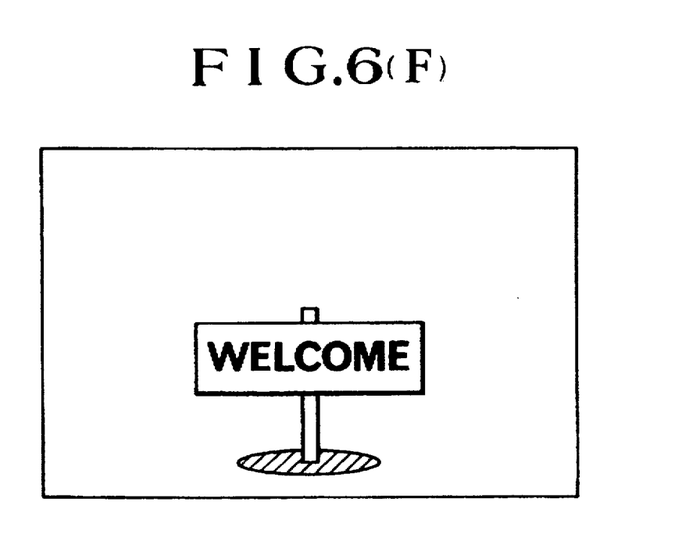

FIG. 6(D) schematically shows a fourth example of the control data (control data 4) stored within the ROM of the external storage device 9. The preparation switch 12 is first operated by the operator in the same manner as in the case of the control data 1, 2 or 3. Then with the external storage device 9 connected to the camera body 1 and the control data 4 selected, the control part 11 carries out processes according to the control data 4 in the following manner:

A tape cassette is detected to be mounted on the VTR part 7 in response to a first instruction for making a check for the tape. In accordance with a key input waiting instruction, the control part 11 waits until the control switch 13 is operated by the operator. After the control switch 13 is operated, a title is inserted into the recording video signal in response to an instruction for starting a title combining action in the same manner as described in the foregoing. Next, another tape checking instruction is given. However, since the tape is mounted in this instance, the control part 11 comes to execute a next instruction. Then, in accordance with another key input waiting instruction, the control part 11 waits until the control switch 13 is again operated by the operator. After the control switch 13 is again operated, the image forming part 15 is controlled and caused, in response to a title-combining ending instruction, to stop combining the title image data with the video signal. After this, a tape checking instruction is given for the third time. However, the control operation also comes to execute a next instruction. Then, in response to a control ending instruction, the flow of operation comes back to the step 301 to terminate the control operation.

In a case where no tape cassette is mounted on the VTR part 7, the control operation comes to execute a next instruction after the first tape checking instruction. Then, in response to the title-combining beginning instruction, the image forming part 15 is controlled and caused to combine stored image data with the recording video signal. At the time of the second tape checking instruction, the operation also comes to execute the next instruction which is the title-combining ending instruction. In accordance with it, the image forming part 15 is controlled to bring the title image data combining action to a stop. Further, when the third tape checking instruction is given, the control operation likewise comes to execute a next instruction. Then, in accordance with a control repeating instruction, the flow of operation comes back to the step 305 to repeat the image data selecting and controlling actions from the beginning.

The above-stated processes according to the control data 4 enable the operator to start and stop the title image combining action by simply turning the control switch 13 on with the tape cassette mounted on the VTR part 7. In a case where no tape cassette is mounted, the start and stop of the title image combining action are automatically carried out. In the latter case, with the system programmed to spend a given period of time in detecting the mounted state of the tape cassette in accordance with the tape checking instruction, the title corresponding to the image data selected is displayed just for a given period of time at the EVF (electronic viewfinder) 19. This enables the operator to know what kind of image data is stored. Further, with the cassette mounted after the confirmation, the title image confirmed can be smoothly combined with the video signal by returning the control operation back to the step 305.

The functions of the control data have been described in the foregoing only for the control data 1 to 4 shown in FIGS. 6(A) to 6(D). However, functions of other diverse kinds are conceivable. For example, the control data may be arranged to include the fade-in and fade-out of sounds, changeover between color- and monochromatic-shooting modes at the camera signal processing circuit 5, shutter speed changeover at the image sensor driving part 4, etc. The camera part and the VTR part can be controlled with apposite timing after insertion of a title image by including these functions in the control data.

In accordance with this invention, as described in the foregoing, a signal recording system can be arranged to be capable of recording signals of varied kinds with an extremely simplified operation.

Figure 7:
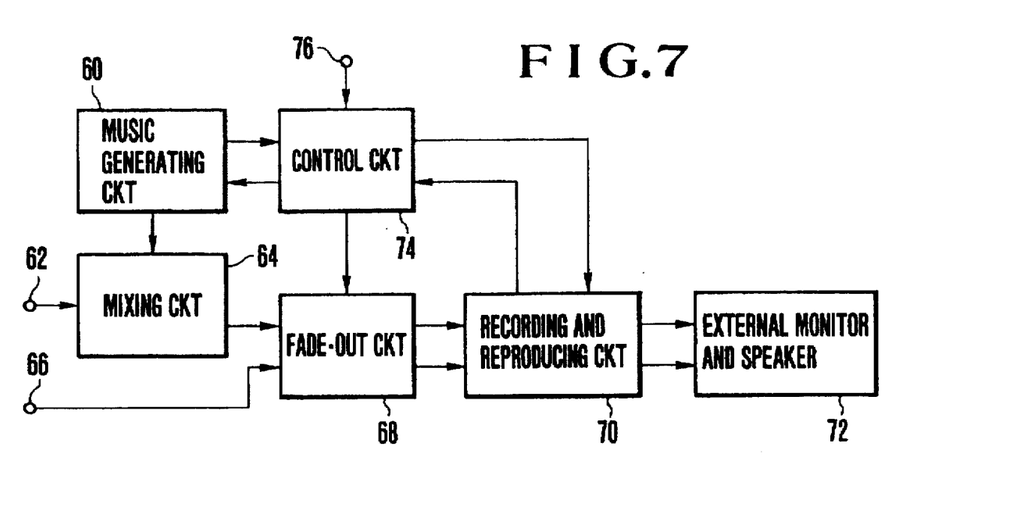
FIG. 7 is a block diagram showing the arrangement of another embodiment of the invention.

FIG. 7 is a block diagram showing in outline the arrangement of another embodiment of the invention. The illustration includes a music generating circuit 60; an input terminal 62 for an audio signal; a mixing circuit 64 which is arranged to mix a music signal generated by the music generating circuit 60 with the audio signal supplied to the input terminal 62; an input terminal 66 for a video signal; a fade-out circuit 68 which is arranged to fade-out the output of the mixing circuit 64 and the video signal of the video signal input terminal 66 in accordance with an external control signal; a recording and reproducing circuit 70 which is capable of recording and reproducing sounds and images; a combination 72 of an external monitor and a speaker; a control circuit 74 (a microcomputer) which controls the music generating circuit 60, the fade-out circuit 68 and the recording and reproducing circuit 70; and an input terminal 76 for a key signal which instructs the control circuit 74 to begin to perform a prescribed operation.

The music generating circuit 60 supplies to the control circuit 74 an advance notice signal which notifies in advance the end of music at a point of time near to the end of the music generated. The recording and reproducing circuit 70 supplies to the control circuit 74 a preparation completion signal which indicates completion of preparation for the recording or reproduction.

Figure 8:
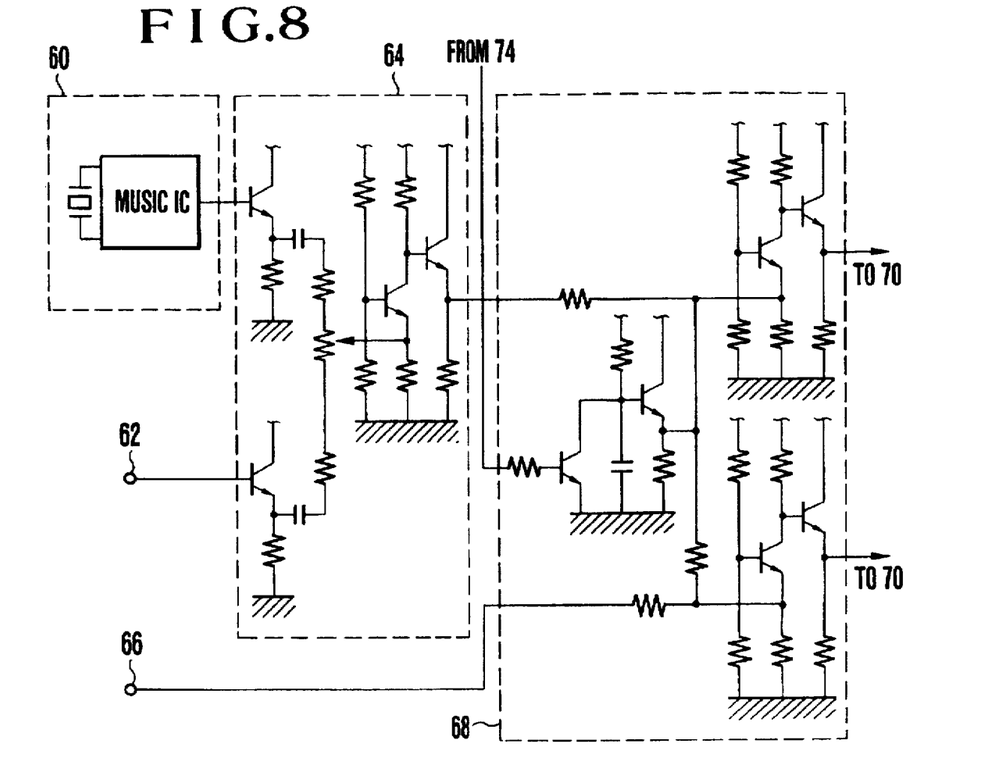
FIG. 8 shows by way of example the arrangement of a music generating circuit, a mixing circuit and a fade-out circuit.

FIG. 8 shows by way of example the basic circuit arrangement of the music generating circuit 60, the mixing circuit 64 and the fade-out circuit 68. The music generating circuit 60 is, for example, composed of a music IC. The mixing circuit 64 is arranged to permit adjustment of a mixing ratio by means of an external volume control part. The fade-out circuit 68 is arranged to gradually attenuate, in accordance with a control signal from the control circuit 74, the video and audio signals being supplied to the recording and reproducing circuit 70.

Figure 9:
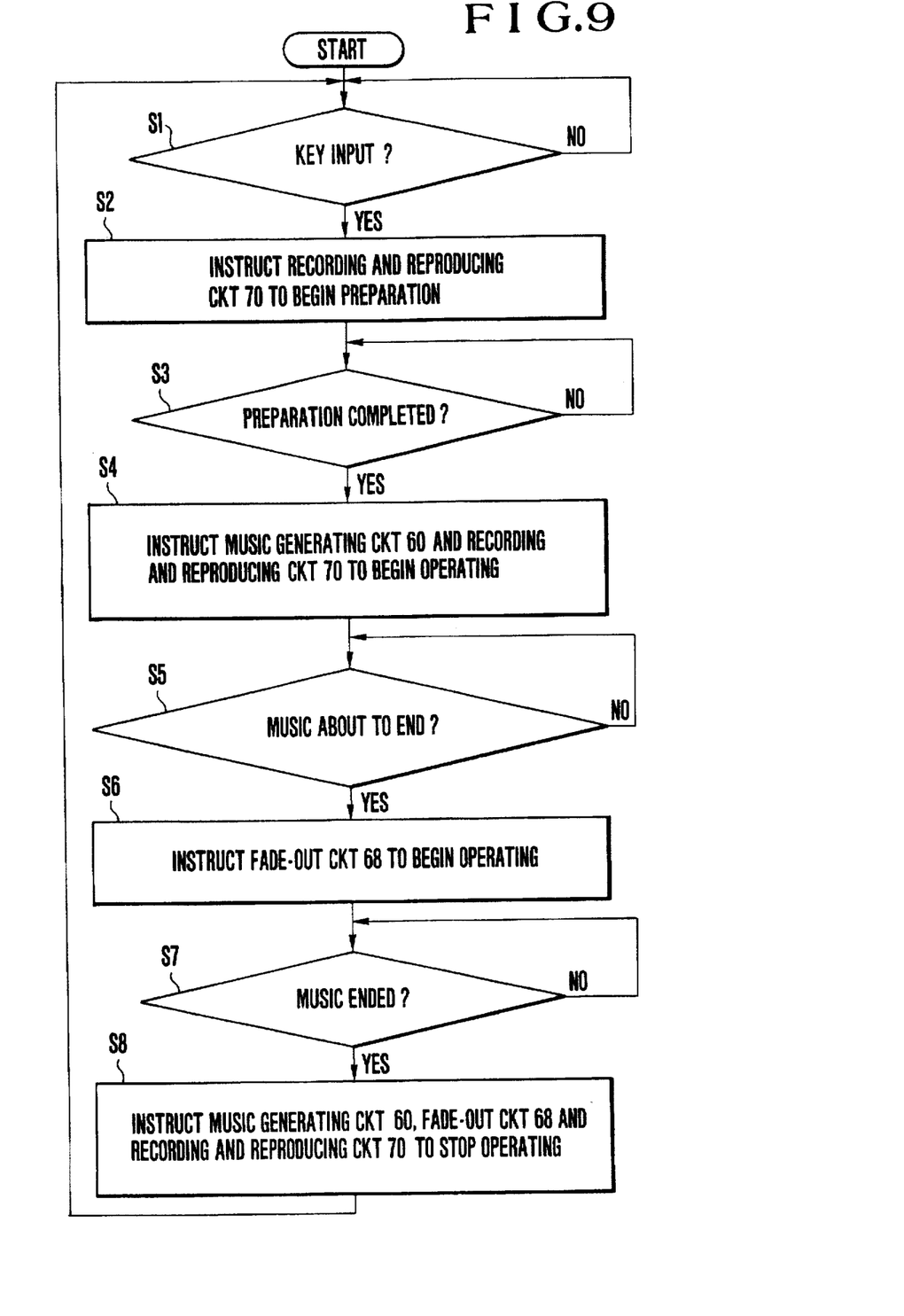
FIG. 9 is a flow chart showing the operation of the embodiment shown in FIG. 7.

Referring to FIG. 9 which is a flow chart, the operation of the system shown in FIG. 7 is described as follows: At a step S1: A check is made to find if a key signal for instructions to start the recording or reproduction is supplied from the input terminal 76 to the control circuit 74. If so, the flow of operation comes to a step S2. At the step S2: The control circuit 74 supplies a signal to the recording and reproducing circuit 70 to prepare for recording or reproduction. At a step S3: A check is made for a preparation completion signal from the recording and reproducing circuit 70. Step S4: In response to the preparation completion signal, a control signal is supplied to the music generating circuit 60 and the recording and reproducing circuit 70 for the start of their operations. This causes the music generating circuit 60 to generate music and, at the same time, the recording and reproducing circuit 70 to begin the recording or reproduction.

The mixing circuit 64 then mixes the music signal output from the music generating circuit 60 and the audio signal supplied to the input terminal 62. A mixture output thus obtained is applied via the fade-out circuit 68 to the recording and reproducing circuit 70. At this point of time, the fade-out circuit 68 is in a signal passing state.

Step S5: When the music generated by the music generating circuit 60 approaches an end and thus comes at a point, say, 10 seconds before the end, the music generating circuit 60 supplies to the control circuit 74 a signal giving an advance notice of the end of the music generation. Step 6: In response to the advance notice signal from the music generating circuit 60, the control circuit 74 sends a control signal to the fade-out circuit 68. The control signal causes the fade-out circuit 68 to fade out the video signal from the input terminal 66 and the output of the mixing circuit 64. Step S7: When the music comes to an end, the music generating circuit 60 sends a music end signal to the control circuit 74, informing the latter of the end of the music. Step S8: In response to the music end signal, the control circuit 74 sends a control signal to the music generating circuit 60 and the fade-out circuit 68 to instruct them to stop operating. Further, a control signal is sent also to the recording and reproducing circuit 70 to instruct it to stop the recording or reproduction. This brings the operation of the music generating circuit 60 and that of the recording and reproducing circuit 70 to a stop.

As apparent from the description given above, the embodiment which is arranged as shown in FIGS. 7, 8 and 9 permits the operator to simultaneously start the recording or reproduction of images and music by a single operation on the system. Further, since the music can be completed for each scene, a plurality of scenes can be neatly connected to each other without disrupting the music of each scene.

What is claimed is:

1. A signal processing apparatus, comprising:
   (a) input means for inputting a first video signal;
   (b) a storing portion for storing a second video signal to be combined with the first video signal and a control signal indicating a combining start timing and a combining end timing of the second video signal for the first video signal;
   (c) combining means for combining the second video signal with the first video signal in response to the control signal read out from the storing portion, said combining means repeatedly combining the second video signal with the first video signal during a period in which said combining action is being instructed by the control signal; and (d) recording means for recording a video signal output from said combining means, said control signal including a signal indicating a start of a recording action by said recording means, said recording means recording the video signal output from said combining means during a period in which a recording action is being instructed by the control signal.

2. An apparatus according to claim 1, further comprising:

video signal processing means including a fade circuit for fading-in or fading-out said first video signal; and control means for controlling fading-in and fading-out of said first video signal effected by said fade circuit.

3. An apparatus according to claim 1, further comprising a video camera for generating said first video signal.

4. An apparatus according to claim 1, wherein said first video signal includes a moving image signal and said second video signal includes at least one of a still image signal and a character signal.

5. An apparatus according to claim 1, wherein said storage portion is attachable and detachable relative to said apparatus.

6. A storing device for use in a video signal processing system, wherein said system combines a second video signal with a first video signal and includes a processing device for recording on a recording medium the combined video signals, comprising:

(a) storing means for storing the second video signal to be combined with the first video signal and a control signal indicating a combining start timing and a combining end timing of the second video signal for the first video signal; and (b) output means for outputting to said combining device the second video signal and the control signal, said processing device repeatedly combining the second video signal with the first video signal during a period in which said combining action is being instructed by the control signal output from said output means, said control signal including a signal indicating a start of a recording action by the processing device, said processing device recording the combined video signal during a period in which the recording action is being instructed by the control signal.

7. A device according to claim 6, wherein said processing device fades in and fades out said first video signal, storing means storing the control signal for controlling fading-in and fading-out of said first video signal effected by said fade operation.

8. A device according to claim 6, wherein said system includes a video camera for generating said first video signal.

9. A device according to claim 6, wherein said first video signal includes a moving image signal and said second video signal includes at least one of a still image signal and a character signal.

10. A storing device for use in a video signal processing system, including a processing device for combining a second video signal representing a predetermined object with a first video signal, comprising:

(a) storing means for storing the second video signal to be combined with the first video signal and a control signal for controlling said processing device; and (b) output means for outputting to said processing device the second video signal and the control signal, generating means for generating a third video signal representing an object different from the predetermined object, said processing device having a first state in which the first video signal is combined with the second video signal output from said output means and a first combined video signal in obtained, a second state in which the first combined video signal is combined with the third video signal and a second combined video signal is obtained and a third state in which the first video signal is not combined with the second and third video signals, said processing device changing a state of said processing device between the first, second and third states according to the control signal read out from the storing means.

11. A device according to claim 10, wherein said storage means stores the control signal for controlling terminating of the combining operation, said processing device controlling terminating of combining operation on the basis of the control signal.

12. A device according to claim 10, wherein said system includes a video camera for generating said first video signal.

13. A device according to claim 10, wherein said first video signal includes a moving image signal and said second video signal includes at least one of a still image signal and a character signal.

14. A signal processing apparatus, comprising:

(a) input means for inputting a first video signal;

(b) a storing portion for storing a second video signal representing a predetermined object to be combined with the first video signal and a control signal for controlling said apparatus;

(c) generation means for generating a third video signal representing an object different from the predetermined object; and (d) combining means for combining the first video signal, the second video signal read out from the storing portion and the third video signal generated by said generation means, said apparatus having a first state in which said combining means combines the first video signal with the second video signal read out from the storing portion and obtains a first combined video signal, a second state in which said combining means combines the first combined video signal with the third video signal and obtains a second combined video signal and a third state in which said combining means does not combine the first video signal with the second and third video signals, said apparatus changing a state of said apparatus between the first, second and third states according to the control signal read out from the storing portion.

15. An apparatus according to claim 14, wherein said storing portion further stores a control signal indicating a combining end timing of the second video signal for the first video signal.

16. An apparatus according to claim 14, further comprising a video camera for generating the first video signal.

17. A device according to claim 14, wherein said first video signal includes a moving image signal and said second video signal includes at least one of a still image signal and a character signal.

18. An apparatus according to claim 14, further comprising:

video signal processing means including a fade circuit for fading-in or fading-out said first video signal; and control means for controlling fading-in and fading-out of said first video signal effected by said fade circuit.

19. A signal processing apparatus, comprising:

(a) generating means for generating a first video signal;

(b) a storage portion for storing a second video signal to be combined with the first video signal and a control signal indicating a combining start timing of the second video signal for the first video signal;

(c) combining means for combining the second video signal read out from the storage portion with the first video signal according to the control signal read out from the storage portion; and (d) recording means for recording a video signal from said combining means, the control signal stored in the storage portion including a signal indicating a start of a recording action by said recording means, said recording means recording the video signal from said combining means according to the control signal indicating the start of the recording action read out from the storage portion.

20. An apparatus according to claim 19, further comprising a display for displaying an image corresponding to the second video signal read out from the storage portion.

21. An apparatus according to claim 19, wherein said second video signal stored in said storage portion comprises video signals corresponding to plural kinds of image.

22. An apparatus according to claim 21, further comprising an operation member for determining an image of the plural kinds of images, said combining means combines the second video signal corresponding to the image determined by said operation member with the first video signal.

23. An apparatus according to claim 19, wherein said generating means includes a video camera for obtaining the first video signal.

24. An apparatus according to claim 19, wherein said recording means records the video signal on a recording media.

\* \* \* \* \*

UNITED STATES PATENT AND TRADEMARK OFFICE
CERTIFICATE OF CORRECTION

PATENT NO. : 5,784,521
DATED : July 21, 1998
INVENTOR(S) : Yoshihiro Nakatani, et al.

It is certified that error appears in the above-identified patent and that said Letters Patent is hereby corrected as shown below:

Col. 2, line 13, delete "removabe" and insert -- removable --.

Col. 11, line 50, before "storing" insert -- said --.

Signed and Sealed this

Fifth Day of January, 1999

Attest:

Attesting Officer

Acting Commissioner of Patents and Trademarks